April 11, 1939. H. W. KOST 2,154,046
FASTENING CLIP FOR CABLES OR THE LIKE
Filed Oct. 26, 1938
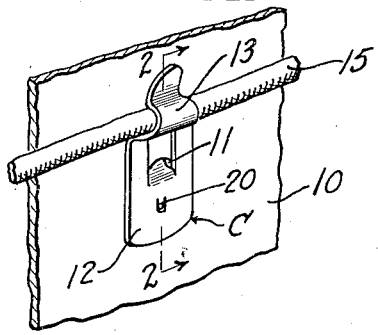
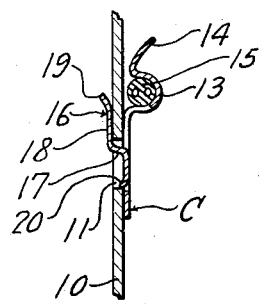
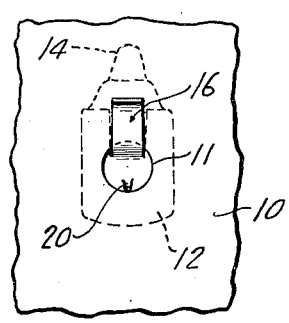
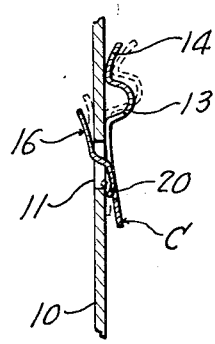
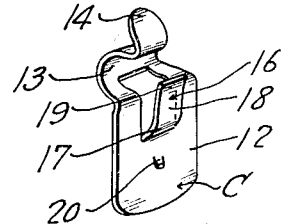
Inventor
Harold W. Kost
By Malcolm W. Fraser
Attorney Patented Apr. 11, 1939

2,154,046

UNITED STATES PATENT OFFICE 2,154,046

FASTENING CLIP FOR CABLES OR THE LIKE

Harold W. Kost, Ferndale, Mich., assignor to Detroit Harvester Company, Detroit, Mich., a corporation of Michigan Application October 26, 1938, Serial No. 237,069

3 Claims. (Cl. 24—259)

This invention relates to fasteners for wires, conduits, tubes and the like adapted to hold them in the desired position on supports, and an object is to produce a simple and inexpensive fastener of this character which can be readily and conveniently applied to an apertured support with a minimum amount of trouble and effort and which will remain in position irrespective of jars or shocks imparted to the support, thereby militating against unwarranted or accidental disengagement.

Another object is to produce a fastener of the above character having the new and improved features of construction and arrangement hereinafter described, and for purposes of illustration but not of limitation, an embodiment of the invention is shown on the accompanying drawing in which Figure 1 is a perspective view of the fastening clip applied to a panel support for supporting a cable or the like;

Figure 2 is a vertical sectional view on the line 2—2 of Figure 1;

Figure 3 is an elevation of the rear face of the supporting panel with the fastening clip in position;

Figure 4 is a vertical sectional view showing the manner in which the fastening clip is applied to the support; and Figure 5 is an enlarged perspective view of the fastening clip.

The illustrated embodiment of the invention comprises a supporting panel 10 having a hole 11 through which the tongue 16 of the fastening clip C is adapted to extend. The fastening clip C comprises a strip or body portion 12, generally rectangular in shape, of sheet material preferably spring sheet metal such as high carbon steel. One end of the body portion is tapered and formed into a bowed portion 13 having a reversely bent tab 14. The bowed portion 13 is adapted to receive a cable 15 as shown. It will be understood that in addition to cables, wires, tubes and the like may be supported by a fastener of this character. As indicated in Figure 2, it is preferred that the inner end of the tab 14 be spaced slightly outward from the plane of the body portion 12 to enable the cables or the like to be conveniently mounted.

Struck out from the body portion 12 in the region of the bowed portion 13 is a tongue 16 which as shown in Figure 2 has an outwardly extending wall 17 substantially the thickness of the supporting panel 10, a portion 18 which is substantially parallel with the body portion 12 and an outwardly curved or inclined end portion 19 which terminates at a point substantially midway of the bowed portion 13.

Spaced from the inner end of the tongue 16 and on the underside of the body portion is a relatively small tongue or prong 20 which is struck out of the metal of the body and inclines outwardly and in a direction opposite to that of the tongue 16. The free end of the prong 20 is spaced from the shoulder formed between the wall 17 and portion 18 a distance slightly less than the diameter of the hole 11. The free end of the prong 20 serves as an abutment to engage the edge of the hole 11 for retaining the clip C in position.

In applying the fastening clip C to the supporting panel 10, it will be understood that the free end of the tongue 16 is inserted in the hole 11 whereupon the clip C is forced along the surface of the panel 10, the tongue 16 and body 12 securly gripping the opposite sides of the panel. Such movement continues until the prong 20 snaps into the hole 11 as indicated in Figures 2 and 4 whereupon the fastener is securely held against accidental removal. It will be apparent that retrograde movement of the clip is prevented by the abutment in the form of the prong 20. In order to remove the fastener, it is necessary that a sharp tool be inserted between the end of the fastener C adjacent the prong 20 in order to pry the fastener to such position that the prong is free of the hole, the tongue 16 being resilient and flexing sufficiently to allow such movement. Thereupon the fastener can be readily disengaged from the panel 10. The fastener can also be disengaged by pressure against the underside of the clip which is sufficient to tilt the same to free the prong 20 from the hole 11.

It is to be understood that numerous changes in details of construction, arrangement and operation may be effected without departing from the spirit of the invention especially as defined in the appended claims.

What I claim is:

1. A fastening device for securing a cable, or the like, to a panel having a hole, comprising a clip having a substantially flat body, means attached to the body for holding a cable, or the like, a resilient tongue attached to the body and extending laterally of and then parallel with the same in superimposed relation with one face thereof, and a prong projecting laterally of said body in the same direction as said tongue and spaced therefrom, whereby said body may lie flat against one face of the panel with the tongue extending through the hole and engaging the other face of the panel in opposition to said body and with said prong engaging the wall of the hole at a point opposite the place where the tongue extends through the hole to prevent unintentional withdrawal of the tongue from the hole.

2. A fastening device for securing a cable, or the like, to a panel having a hole, comprising a clip having a substantially flat body, means attached to one edge of the body to project laterally therefrom for holding a cable, or the like, a resilient tongue attached to the central portion of the body and extending laterally of and then parallel with the same in superimposed relation with one face thereof, and a prong projecting from the same side of the body as said tongue but in a direction away from the tongue and spaced therefrom, whereby said body may lie flat against one face of the panel in opposition to said body and with said prong engaging the wall of the hole at a point opposite the place where the tongue extends through the hole to prevent unintentional withdrawal of the tongue from the hole.

3. A fastening device for securing a cable, or the like, to a panel having a hole, comprising a clip having a substantially flat body, a bowed cable receiving and holding portion projecting from one edge of the body, a resilient tongue integral with the body to extend laterally from substantially the central portion of the same and then parallel thereto in superimposed relation with one face thereof, and a prong integral with the body to extend laterally on the same side as said tongue and spaced therefrom, whereby said body may lie flat against one face of the panel with the tongue extending through the hole and engaging the other face of the panel in opposition to said body and with said prong engaging the wall of the hole at a point opposite the place where the tongue extends through the hole to prevent unintentional withdrawal of the tongue from the hole.

HAROLD W. KOST.